March 7, 1939.　　　G. M. PRENTICE　　　2,149,941
COILING MACHINE
Filed June 6, 1938　　　2 Sheets-Sheet 1
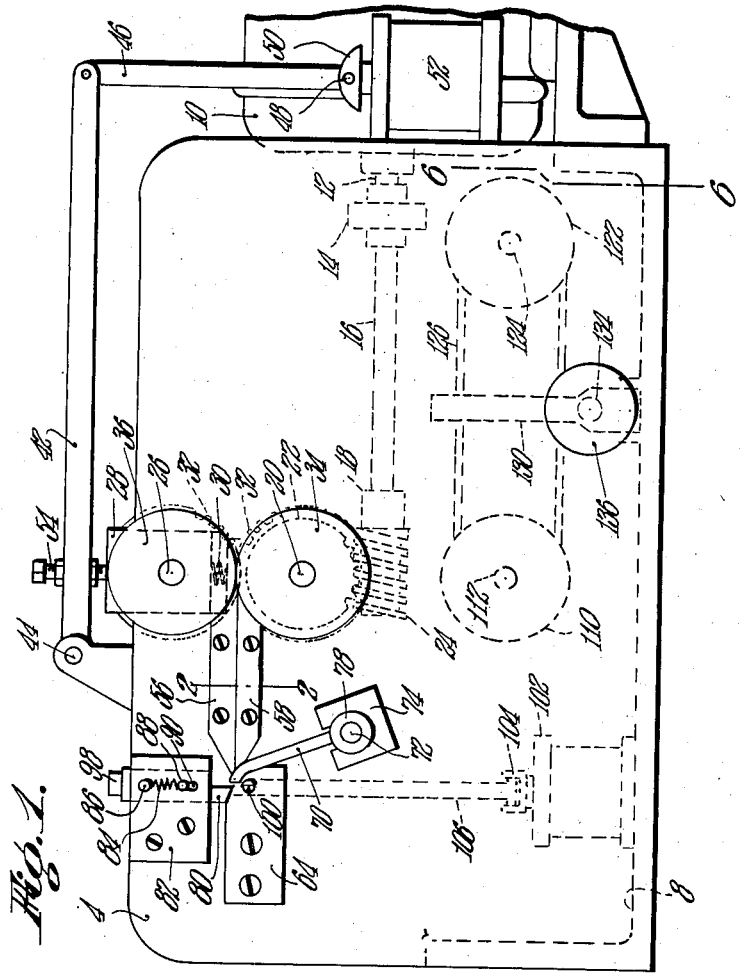
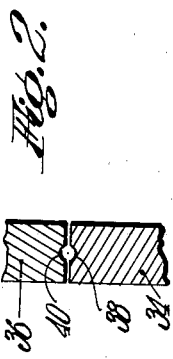
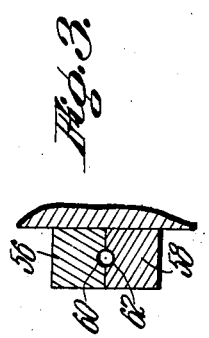
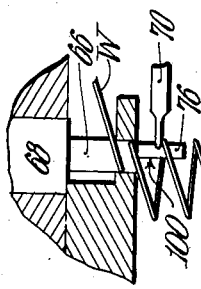
INVENTOR.
George M. Prentice.
BY Walter C Ross
ATTORNEY.

March 7, 1939.  G. M. PRENTICE  2,149,941
COILING MACHINE
Filed June 6, 1938  2 Sheets-Sheet 2

INVENTOR.
George M. Prentice.
BY
ATTORNEY.

Patented Mar. 7, 1939

2,149,941

UNITED STATES PATENT OFFICE 2,149,941

COILING MACHINE

George M. Prentice, Holyoke, Mass., assignor to White & Wyckoff Mfg. Co., Holyoke, Mass., a corporation of Massachusetts Application June 6, 1938, Serial No. 212,147

5 Claims. (Cl. 153—67)

This invention relates to improvements in coiling machines and the principal objects of the invention are directed to the provision of a machine for making coils from wire or the like which is simple in form so as to be economical to manufacture and occupy but small space, compact in arrangement, and which is adapted to operate efficiently at high speeds.

Various novel features and advantages of this invention will be had from the following description of the present preferred form thereof, reference being had to the accompanying drawings, wherein:

Fig. 1 is a front elevational view of a coiling machine embodying the novel features of the invention;

Fig. 2 is an enlarged sectional elevational view through the coacting peripheral edges of the feed rolls of the machine shown in Fig. 1;

Fig. 3 is a sectional elevational view on the line 2—2 of Fig. 1;

Fig. 4 is an enlarged sectional plan view showing the mandrel on which a coil is formed;

Figure 5:
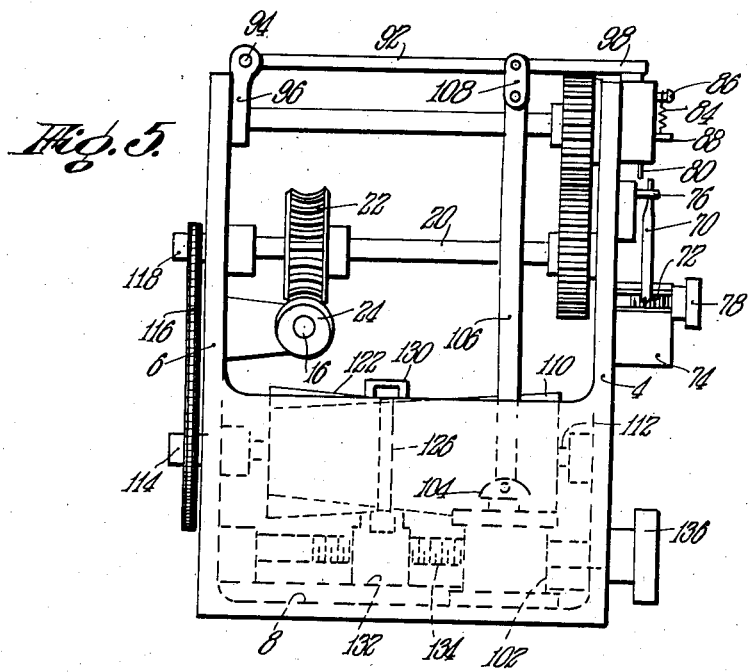
Fig. 5 is an end elevational view of the machine shown in Fig. 1.

Referring now to the drawings more in detail the invention will be fully described.

The machine preferably has forward and rear walls 4 and 6 and a lower wall 8. Means for driving the machine may consist of a motor 10 having a shaft 12 connected as by a coupling 14 to a drive shaft 16.

The shaft 16 is rotatable in one or more bearings such as 18 and a lower feed roll shaft 20 which is rotatable in the side walls 4 and 6 carries a worm wheel 22 in mesh with a worm 24 on the shaft 16. An upper shaft 26 is rotatable in a box 28 that is slidable up and down in the frame 4 as shown in Fig. 1 and the said box 28 is spring pressed upwardly by means of a spring 30. The shafts 20 and 26 carry intermeshing gears whereby the upper shaft 26 is driven from the lower one 20.

On the forward ends of the shafts 20 and 26 there are coacting feed rolls 34 and 36 which have one or more peripheral grooves such as 38 and 40 shown in Fig. 2. A lever 42 pivoted at 44 for swinging movements is pivotally connected at its end, as shown, to a link 46. The link 46 has its lower end pivotally connected at 48 to the upper end 50 of a movable member of a solenoid 52. An adjusting bolt or screw 54 is carried by the lever 42 and is arranged to abut the upper side of the box 28. As the solenoid is energized to draw the movable member thereof downwardly the lever 42 is actuated in such a way that the member 54 thereof acts on the box 28 to depress it against the action of the spring 30.

Material to be coiled which may be wire is fed into the grooves of the feed rolls and when the solenoid is energized to bring about depressing of the box or bearing 28, the rolls 34 and 36 are in feeding relation and feed the wire forwardly between guides 56 and 58 which are provided with guiding grooves 60 and 62. When current is cut off from the solenoid the spring 30 urges the box 28 upwardly so that the feed rolls no longer act to feed the wire.

A member 64 forwardly of the guides 56 and 58 receives the end part 66 of a mandrel 68 and the said part 66 is provided with a spiral groove into which wire is fed from the guides. The feed rolls feed the wire through the guides and into the spiral groove and as the wire is fed onto the mandrel it is caused to pass into and around the mandrel and emerges from the mandrel in the form of a coil C (see Fig. 4).

A finger member 70 extends upwardly from a screw 72 associated with a block 74 and the upper end of the member 70 overlies an extension 76 of the mandrel. A member 78 associated with screw 72 is provided and by rotation thereof screw 72 and finger member 70 are moved in and out or in such a manner that the upper end of the finger is moved back and forth or longitudinally of the extension 76. The convolutions of the coil are controlled by the finger which according to the invention determines the pitch of the coil.

A cutter 80 is slidable vertically in a block 82. A spring 84 has its upper end secured to a member 86 of the cutter and its lower end is secured to a pin 88 movable in a slot 90 of the block 82 to urge the cutter upwardly. A lever 92 is pivoted at 94 to a bracket 96 secured to the rear wall 6 and has its outer end 98 arranged to bear on the upper end of the cutter 80. An extension 76 of the mandrel has an edge part 100 with which the cutter 80 cooperates in a downward stroke to cut off a coil.

A solenoid 102 has a movable part 104 pivotally connected to the lower end of a link 106. The upper end of said link is pivotally connected to a lever 92 by a member 108 as shown in Fig. 5.

As the solenoid 102 is energized to cause the movable member thereof to move downwardly the lever 92 is moved through the link 106 so that the cutter 80 is depressed. A cone pulley 110 has a shaft 112 rotatably mounted in suitable bearings of the side walls and a sprocket 114 of said shaft 112 is connected by a chain 116 to a sprocket 118 on shaft 20 whereby shaft 112 is driven from shaft 20.

Another or second cone pulley 122 has a shaft 124 journalled similarly to the shaft 112 and a shiftable belt 126 operatively engages the cone pulleys. A shifter 130 extending upwardly at opposite sides of the belt 126 is guided in some suitable manner as by a guide 132 for movements back and forth longitudinally and between the cone pulleys. A screw shaft 134 is suitably journalled in the walls 4 and 6 for rotation and is in threaded engagement with the shifter 130. A manually engageable member 136 forwardly of wall 4 is secured to the shaft 132. As the member 136 is rotated in one direction or the other it rotates shaft 134 so that the shifter is moved back and forth to shift the belt along the pulleys for thus varying the relative speeds of the cone pulleys 122 and 110.

Figure 6:
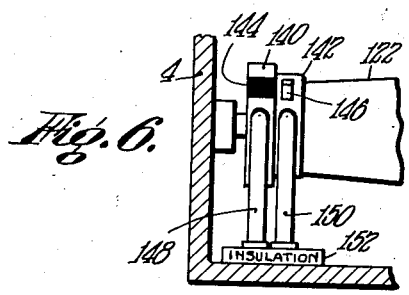
Fig. 6 is a sectional elevational view on the line 6—6 of Fig. 1.

At the end of cone pulley 122 as in Fig. 6 there are disc like members 140 and 142. The former has a section of insulation in its periphery indicated by 144. The disc 142 has a projection or contact member 146. Contacts 148 and 150 are carried by a block of insulation 152 and are arranged for contacting with the periphery of member 140 and with the projection 146 as the cone pulley 122 rotates. Disc 140 and contact 148 are in contacting relation during the revolution of the cone pulley 122, and are in a circuit including solenoid 152 which actuates the feeding action of the feed rolls. The projection 146 and contact 150 are arranged so they come into contact when it is desired that the cutter 80 be moved downwardly.

By shifting the belt associated with the cone pulleys the time during which feed rolls are in feeding relation may be varied and in that way it is possible to vary the length of the coil being wound.

The insulating member 144 of disc 140 is disposed with reference to the projection 146 in such a manner that when the feed rolls are in non-feeding relation as when an insulating block is in engagement with contact 148 the projection 146 contacts with the contact 150 so that the cutter operates to cut off a coil while the feeding of the wire is stopped. Thus the amount of wire is fed by the feed rolls to form a coil of the desired length, then the feeding of the wire is stopped and the cutter operates to cut off the coil formed.

Figure 7:
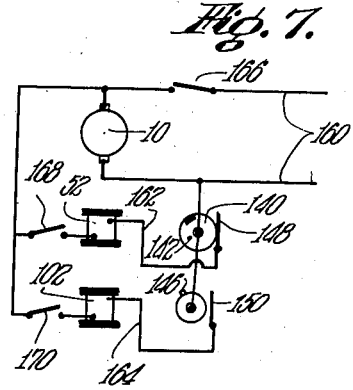
Fig. 7 is a small scale wiring diagram.

The solenoids are connected to the contacts according to one form of the invention in the following manner, see Fig. 7. The current supply is represented by lines 160 which are connected to the motor 10. Disc 140 is connected to one line 160 and contact 148 is connected by 162 to solenoid 52. The solenoid is also connected to the other line 160. Contact 150 is connected by 164 to the solenoid which is also connected to line 160. The disc 142 is connected to the other line 160. Switches 166, 168, and 170 are provided for the leads to the motor 10 and the solenoids 52 and 102 so that the circuits for the motor and said solenoids are independently operative.

While I have described the invention in great detail and with respect to the present preferred form thereof, it is not desired to be limited thereto since many changes and modifications may be made therein without departing from the spirit and scope of the invention. What it is desired to claim and secure by Letters Patent of the United States is:

1. A coiling machine comprising in combination, a pair of feed rolls for feeding a wire, a coiling means for receiving said wire from said feed rolls and forming same into a coil, a means for cutting off successive coils, a means for controlling the operation of said feed rolls, and a means controlling the operation of said cutting off means, all adapted and arranged whereby said cutting off means operates when a coil of predetermined length has been formed.

2. A coiling machine comprising in combination, a pair of feed rolls relatively movable between feeding and non-feeding relation, means to move said rolls into feeding relation, means for receiving wire from the feed rolls and forming a coil therefrom, a movable cutter for cutting off a coil, means to actuate the same, the said means for moving said feed rolls and the said actuating means including separate solenoids, circuits for said solenoids, and variable circuit closing and opening means in said circuits operatively connected to one of said feed rolls.

3. A coiling machine comprising in combination, a pair of feed rolls relatively movable between feeding and non-feeding relation, means to move said rolls into feeding relation, means for receiving wire from the feed rolls and forming a coil therefrom, a movable cutter for cutting off a coil, means to actuate the same, the said means for moving said feed rolls and the said actuating means including separate solenoids, circuits for said solenoids, variable circuit closing and opening means in said circuits operatively connected to one of said feed rolls, the said closing means including relatively rotatable cone members operatively connected by a belt shiftable therealong, rotatable contact members carried by one of said cones and contact members for engaging the same.

4. A coiling machine comprising in combination, a pair of feed rolls relatively movable towards one another into feeding relation and out of feeding relation, means to move said rolls into feeding relation including a solenoid, means to receive wire from said feed rolls and form a coil therefrom, a cutter reciprocable between cutting and non-cutting positions to cut off a formed coil, means to move said cutter to cutting position including a solenoid, variable speed rotatable members including means to vary the relative speeds thereof, driving connections between one of said rotatable members and one of said feed rolls, contact members carried by the other of said rotatable members, contact members engageable by the first named members, and circuits including said solenoids and contact members.

5. A machine for forming wire into a coil comprising in combination, a pair of feed rolls relatively movable between feeding and non-feeding relation, means to move and maintain said rolls in feeding relation for feeding wire, means for receiving wire from said feed rolls and forming a coil therefrom, a movable cutter for cutting off successive coils, means to actuate the same, the said means for moving said feed rolls into feeding relation and the actuating means including separate electrically operated units, circuits for said units, variable circuit control means in said circuits for opening and closing the same, and operative connections between said control means and one of said feed rolls.

GEORGE M. PRENTICE.